G. G. GREENE.
COUPLING MEMBER FOR HAME FASTENINGS.
APPLICATION FILED SEPT. 6, 1911.
1,045,699.
Patented Nov. 26, 1912.
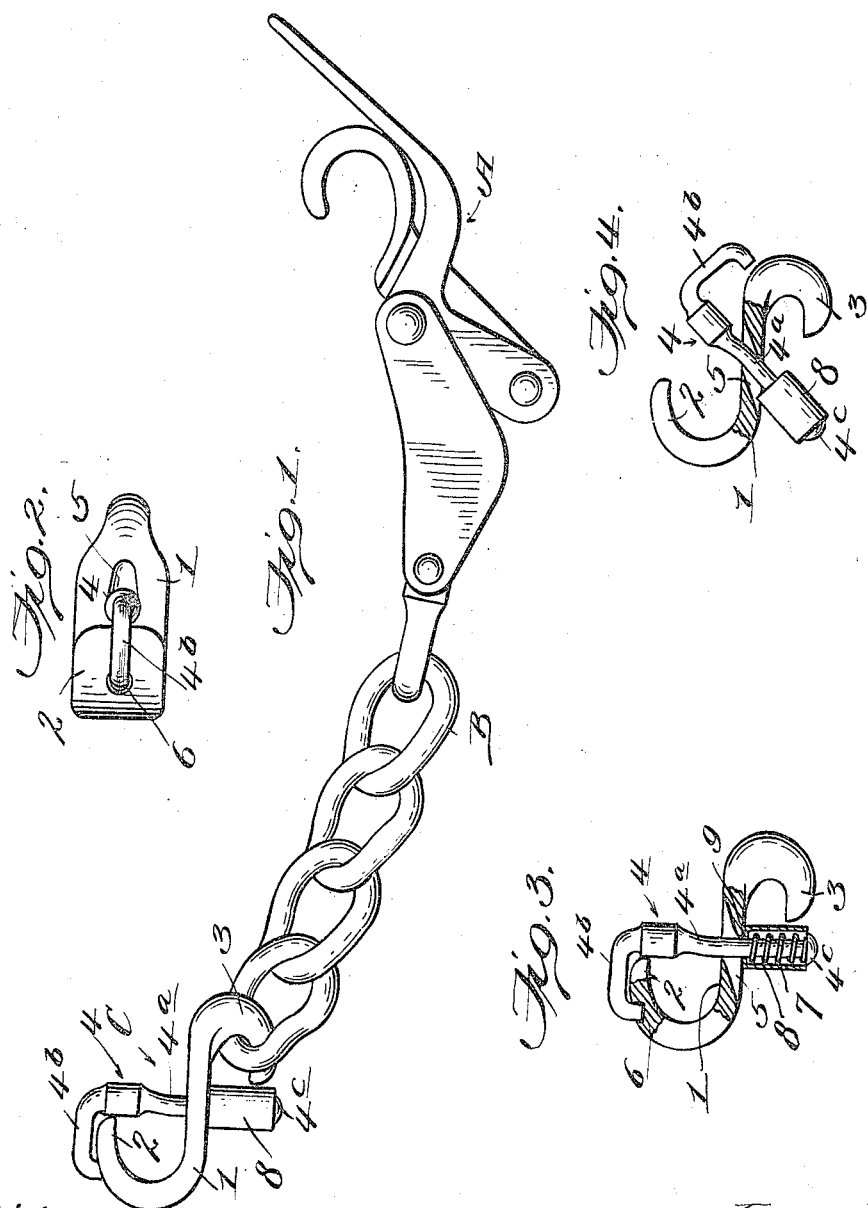

UNITED STATES PATENT OFFICE.

GLENN G. GREENE, OF WARREN, PENNSYLVANIA.

COUPLING MEMBER FOR HAME-FASTENINGS.

1,045,699.

Specification of Letters Patent.

Patented Nov. 26, 1912.

Application filed September 6, 1911. Serial No. 647,908.

*To all whom it may concern:*

Be it known that I, GLENN G. GREENE, a citizen of the United States, residing at Warren, in the county of Warren and State of Pennsylvania, have invented new and useful Improvements in Coupling Members for Hame-Fastenings, of which the following is a specification.

This invention relates to improvements in hame fastenings and it has more particular reference to a device which forms an element of the complete hame fastening and is designed to associate the latter with relative permanency to one of the hames. That is to say, the complete hame fastening has at one end a suitably constructed catch which is manipulated to connect or disconnect the hames whenever the latter are to be applied to or removed from the collar, and at its other end, a device which embodies the present improvement, and which, while detachably associated with the other hame, is not intended to be disconnected therefrom each time that the hames are removed from the collar.

The object of the invention is to provide a device of the character referred to which is of unitary nature, and which may be associated in a safe and positive manner, both with the hame to which it is to be connected, and with the chain or equivalent part of the hame fastening, and which may be quickly and easily connected and disconnected from both of the elements referred to and secured at any desired point on the chain to enable the length of the latter to be increased or decreased as circumstances may require a fastening of greater or less length.

An embodiment of the invention is illustrated in the accompanying drawing, wherein—Figure 1 is an elevation of a hame fastening including a device which embodies the present improvement; Fig. 2 is a top plan view of the said device; Fig. 3 is a sectional view thereof, the parts being in locked or normal position; Fig. 4 is a sectional view, the parts being in unlocked position.

Similar characters of reference designate corresponding parts throughout the several views.

The hame fastening shown in the drawing by way of example includes a safety hook A of suitable construction, a chain B which is connected at one end of the safety hook, and an attachment device C, which forms the subject of the present invention. The attachment device C preferably embodies an ogee or S-shaped body part 1, having its ends formed as hooks 2 and 3, said hooks being located at opposite sides of the shank of the body part. The hook 2 is designed for attachment to one of the hames, the other hame being connected to the hook A, and the hook 3 is designed to engage a suitable link of the chain B. In order that the association of the part 1 with the elements which are engaged by the hooks 2 and 3 may be of safe and positive nature, a locking pin 4 is employed. The pin 4 includes a shank $4^a$ and a finger $4^b$ which projects at a right angle from the upper end of the shank and has an inturned extremity. The shank $4^a$ passes loosely through an opening 5 in the shank of the body 1, the end walls of the opening 5 being parallel and inclined, whereby said opening has, in longitudinal section, the outline of a rhomboid. The inturned extremity of the finger $4^b$ is, in the normal relation of the parts, engaged in a recess 6, formed in the upper side of the hook 2, and it serves the purpose of positively holding the locking pin 4 in operative relation.

The shank $4^a$ is formed at the end opposite to the finger $4^b$ with a head $4^c$, which serves as a seat for an expansive coil spring 7. The spring 7 is confined in a sleeve 8, and its one end bears as above stated against the head $4^c$, while its other end bears against a flange 9 at the upper end of the sleeve 8.
The spring 7 coacts with the inturned extremity of the finger $4^b$ in maintaining the operative relation of the locking pin, serving this purpose by putting such a tension on the pin as will prevent the accidental disengagement of the inturned end of the finger $4^b$ from the recess 6, as is obvious.

In the operative relation of the device, the locking pin serves as a closure for both of the hooks 2 and 3, the upper portion of the pin closing the hook 2 and thus preventing the latter from becoming disconnected from the hame ring, and the lower portion of the pin, which is surrounded by the sleeve 8 closing the hook 3 and in like manner preventing the latter from becoming disconnected from the link of the chain B.

In case it is necessary or desirable to disconnect the device C from the hame or from the chain, or from both, or to increase or decrease the efficient length of the chain by engaging the hook 3 with any particular link, the operation can be very readily carried out by pulling the pin 4 upwardly against the tension of the spring 7, so as to disengage the end of the finger 4$^b$ from the recess 6, and then by moving said pin in such a direction as may be necessary. The pin 4 is, in effect, universally movable, within certain limits, and it may be turned also on the axis of its shank 4$^a$, thus enabling the necessary movement of the pin 4 when the parts are to be dissociated, to be made quickly and with facility. Fig. 4 shows the pin in such position that both of the hooks 2 and 3 are open whereby the device C may be disengaged both from the hame ring and from the link of the chain B. In Fig. 4 the pin has been turned on the axis of the shank 4$^a$ through half a circle, and it has also been turned through an approximately central minor axis of said shank to bring the inturned end of the finger 4$^b$ against the outer face of the hook 3, the pin being held in this relation by the spring 7.

Having fully described my invention, I claim:

1. A device of the type set forth, comprising an ogee body part having its ends formed as hooks, one of the hooks having a recess, and having its shank formed with a central opening the end walls of which are parallel and inclined, a transversely disposed locking pin, the shank of which passes loosely through the opening, the pin having a finger formed at one end thereof for engagement with the recess, and a spring arranged to bear against the other end of the shank of the pin and to cause the finger to remain engaged in the recess, thereby holding the pin in position to close the hooks.

2. A device of the type set forth, comprising a body part having its ends formed as hooks, a locking pin which is associated with the body part in such manner that its shank may close both of the hooks, one of the hooks having a recess, and the pin having a finger formed for engagement in the recess, the pin being axially movable to provide for the disengagement of the finger from the recess and being pivotally movable on the body part to uncover the hooks, and a spring for causing the pin to normally remain in position to close the hooks and with its finger engaged in said recess.

3. A device of the type set forth comprising a body part of S-shaped outline and having reversely curved hook members, a locking pin passing through said body part and related thereto to have both axial and pivotal components of movement, an expansive coil spring surrounding said pin at one side of the body part, a sleeve inclosing said spring, and a finger provided on the other end of said pin for engagement with the adjacent hook member under the tension of said spring.

In testimony whereof I have hereunto set my hand in presence of two subscribing witnesses.

GLENN G. GREENE.

Witnesses:
GRACE GREENE,
A. M. MEAD.

Copies of this patent may be obtained for five cents each, by addressing the "Commissioner of Patents, Washington, D. C."